US008950842B2

United States Patent
Kawafuji et al.

(10) Patent No.: US 8,950,842 B2
(45) Date of Patent: Feb. 10, 2015

(54) IMAGE PROCESSING APPARATUS AND IMAGE PROCESSING METHOD

(75) Inventors: Hiroshi Kawafuji, Kawasaki (JP); Yasunori Fujimoto, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 13/355,689

(22) Filed: Jan. 23, 2012

(65) Prior Publication Data
US 2012/0194595 A1    Aug. 2, 2012

(30) Foreign Application Priority Data

Jan. 28, 2011   (JP) ................. 2011-016782

(51) Int. Cl.
*B41J 2/205*    (2006.01)
*G06K 15/02*    (2006.01)
*G06K 15/10*    (2006.01)

(52) U.S. Cl.
CPC .......... *G06K 15/1869* (2013.01); *G06K 15/107* (2013.01); *G06K 15/1878* (2013.01)
USPC ............................... 347/15; 347/9

(58) Field of Classification Search
CPC ................................... G06K 15/107
USPC ............................................... 347/15
See application file for complete search history.

(56) References Cited

U.S. PATENT DOCUMENTS 7,261,387 B2    8/2007    Nishikori et al.
7,472,977 B2    1/2009    Fujimoto et al.

FOREIGN PATENT DOCUMENTS

JP    4502362 B2    7/2010

*Primary Examiner* — Manish S Shah
*Assistant Examiner* — Jeffrey C Morgan
(74) *Attorney, Agent, or Firm* — Fitzpatrick, Cella, Harper & Scinto

(57) ABSTRACT

In a high print resolution, high image quality mode and a low print resolution, high speed mode, image processes are made in common between them to the extent possible, and the same gradation characteristics and image densities can be obtained between them. For this purpose, for the high image quality mode, a dot arrangement pattern is prepared for a pixel region having gradation data of K levels, which determines the presence or absence of print dots at K-1 areas, and in which the printing of 1 dot is permitted at all of the K-1 areas. On the other hand, for the high speed mode, a dot arrangement pattern which determines the presence or absence of print dots at a number of areas less than K-1 is prepared, and in which the sum of the number of dots permitted to be printed at the pixel region is K-1.

12 Claims, 16 Drawing Sheets

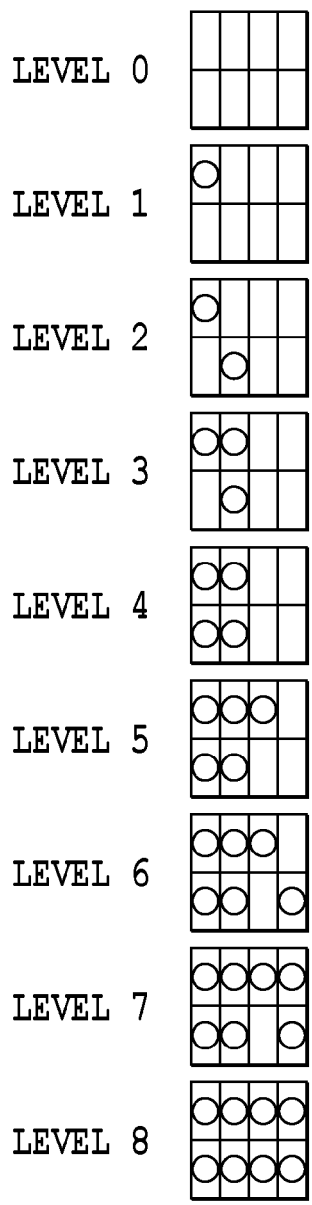
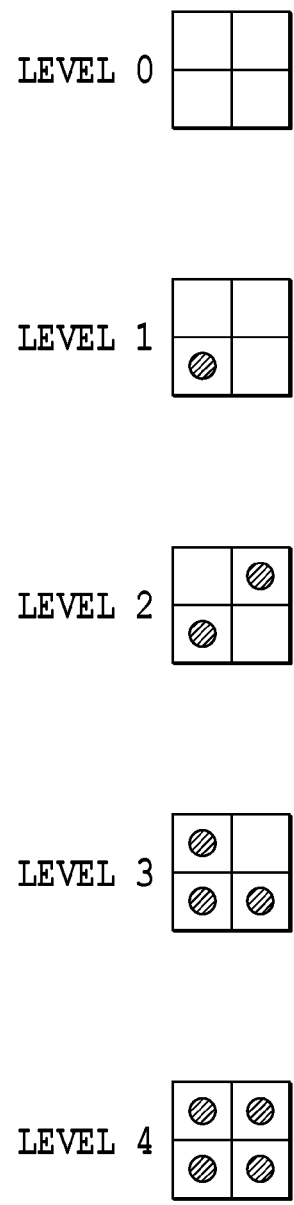
○ 1 IMPACT
◉ 2 IMPACTS
FIG.16A  FIG.16B

IMAGE PROCESSING APPARATUS AND IMAGE PROCESSING METHOD

BACKGROUND OF THE INVENTION

1. Field of the Invention

The invention relates to an image processing apparatus and an image processing method that are capable of expressing predetermined density information by printing a printing material on a printing medium.

2. Description of the Related Art

With professional use ink jet printing apparatuses the output of high grade images approaching that of photo quality is required, but it is not rare for there to be cases of outputting normal documents such as text or graphs. For such documents outputting at a high speed is more necessary rather than outputting at a high grade as silver halide photographs. Thus professional use ink jet printing apparatuses are endowed with multiple printing modes, and configured such that the user is capable of setting these modes according to the intended application. However, technical developments relating to image quality improvement can not always coexist with a printing mode that emphasizes less expensive or faster output. For example, in an ink jet printing apparatus configured such that the amount of ink ejected from the printing elements (referred to hereafter as ejection amount) can not be changed, in order to reduce graininess, all of the ink drops ejected from each of the printing elements aligned on the print head are small drops of a fixed amount. It is possible to obtain a desired density by aligning these dots, that are printed at a designated ejection amount, at a preferred density. As a result the printing resolution necessary for obtaining the desired density increases, and the necessary structural means and data processes become more complicated, as the ejection amount is made smaller in order to improve image quality. Accompanying this, also with respect to a mode that outputs at a higher speed, a state occurs wherein printing must depend on the above structural means and data processing method in order to obtain a desired density, and in which it is difficult to obtain a sufficient density at a satisfactory printing speed.

In order to resolve such issues, for example, Japanese Patent No. 4502362 discloses a printing configuration in which a high speed mode is provided that performs printing at a resolution lower than that of a high image quality mode, and wherein at the high speed mode, only with respect to pixels having a high density level, multiple overlapping dots are printed at 1 print pixel. With such a high speed mode even though printing is performed at a resolution lower than that of the high image quality mode, because it is possible to print inside a pixel the number of dots necessary for the desired density, suitable gradation characteristics can be obtained and a density insufficiency is not invited.

With respect to Japanese Patent No. 4502362, however, because the image processing of the high speed mode is carried out at a resolution lower than that of the image processing of the high image quality mode, tables for image processing (such as a color profile, for example) and programs for quantization must be independently provided for each of these 2 printing modes. In such case the memory necessary for image processing is enlarged. As well, a user that originally creates a color profile for image processing must create separate color profiles for the high speed mode and the high image quality mode, regardless of whether the printing mode is directed towards the same printing medium.

SUMMARY OF THE INVENTION

The present invention was formed in order to resolve the above described problems of the prior art. Thus an object of the invention is to provide an image processing apparatus and an image processing method in which a high print resolution, high image quality mode and a low print resolution, high speed mode are provided, processes are performed between them that are made in common to the extent possible, and the same gradation characteristics and image densities can be obtained between them.

In a first aspect of the present invention, there is provided an image processing apparatus for printing dots at a pixel region of a print medium by causing a print head that ejects ink according to ejection data to scan a plurality of times, wherein the image processing apparatus is capable of executing a first mode for printing dots in the pixel region by N scans of the print head, where N is an integer of 2 or greater, and a second mode for printing dots in the pixel region by M scans of the print head, where M is an integer larger than N, at a print resolution higher than that of the first mode; wherein the first mode is a mode in which: (A-i) gradient data having K levels corresponding to the pixel region is converted to first binary data that determines the print or non-print of dot at each of J areas which comprise the pixel region, where K is an integer of 2 or greater, and where J is an integer of 2 or greater and is smaller than K-1, (A-ii) using a first mask pattern for performing a masking process of the first binary data, first ejection data that corresponds to each of the N scans is created from the first binary data, such that the sum of permitting time to print a dot in the areas that comprise the pixel region by the N scans, becomes K-1, and (A-iii) by the N scans, dots are printed at the pixel region according to the first ejection data, and wherein the second mode is a mode in which: (B-i) the gradient data having K levels corresponding to the pixel region is converted to second binary data that determines the print or non-print of dot at each of K-1 areas which comprise the pixel region, (B-ii) using a second mask pattern for performing a masking process of the second binary data, second ejection data that corresponds to each of the M scans is created from the second binary data, such that the printing of the second binary data is permitted once at each of the K-1 areas which comprise the pixel region by the M scans, and (B-iii) by the M scans, dots are printed at the pixel region according to the second ejection data at a print resolution higher than that of the first mode.

In a second aspect of the present invention, there is provided an image processing method for printing dots at a pixel region of a print medium by causing a print head that ejects ink according to ejection data to scan a plurality of times, comprising: providing a first mode for printing dots at the pixel region by N scans of the print head, where N is an integer of 2 or greater, and a second mode for printing dots at the pixel region by M scans of the print head, where M is an integer larger than N, at a print resolution higher than that of the first mode; wherein the first mode comprises: (A-i) a step wherein gradient data having K levels corresponding to the pixel region is converted to first binary data that determines the print or non-print of dots at each of J areas which comprise the pixel region, where K is an integer of 2 or greater, and where J is an integer of 2 or greater and is smaller than K-1, (A-ii) a step wherein, using a first mask pattern for performing a masking process of the first binary data, first ejection data that corresponds to each of the N scans is created from the first binary data, such that the sum of permitting time to print a dot in the areas that comprise the pixel region by the N scans, becomes K-1, and (A-iii) a step wherein, by the N scans, dots are printed at the pixel region according to the first ejection data, and wherein the second mode comprises: (B-i) a step wherein gradient data having K levels corresponding to the pixel region is converted to second binary data that determines the print or non-print of dots at each of K-1 areas which comprise the pixel region, (B-ii) a step wherein, using a second mask pattern for performing a masking process of the second binary data, second ejection data that corresponds to each of the M scans is created from the second binary data, such that the printing of the binary data is permitted once at each of the K-1 areas which comprise the pixel region by the M scans, and (B-iii) a step wherein, by the M scans, dots are printed at the pixel region according to the second ejection data at a print resolution higher than that of the first mode.

In a third aspect of the present invention, there is provided an image processing apparatus for printing dots at a pixel region of a print medium by causing a print head that ejects ink according to ejection data to scan a plurality of times, wherein the image processing apparatus is capable of executing a first mode for printing dots in the pixel region by N scans of the print head, where N is an integer of 2 or greater, and a second mode for printing dots in the pixel region by M scans of the print head, where M is an integer larger than N, at a print resolution higher than that of the first mode; (B-i) the gradient data having K levels corresponding to the pixel region is converted to second binary data that determines the print or non-print of dot at each of K-1 areas which comprise the pixel region, (B-ii) using a second mask pattern for performing a masking process of the second binary data, second ejection data that corresponds to each of the M scans is created from the second binary data, such that the printing of the second binary data is permitted once at each of the K-1 areas which comprise the pixel region by the M scans, and (B-iii) by the M scans, dots are printed at the pixel region according to the second ejection data at a print resolution higher than that of the first mode, wherein the first mode is a mode in which: (A-i) providing first binary data that determines the print or non-print of dot at each of J areas which comprise the pixel region, where J is an integer of 2 or greater, and where J is an integer of 2 or greater and is smaller than K-1, (A-ii) using a first mask pattern for performing a masking process of the first binary data, first ejection data that corresponds to each of the N scans is created from the first binary data, such that the sum of permitting time to print a dot in the areas that comprise the pixel region by the N scans, becomes K-1, and (A-iii) by the N scans, dots are printed at the pixel region according to the first ejection data.

Further features of the present invention will become apparent from the following description of exemplary embodiments (with reference to the attached drawings).

BRIEF DESCRIPTION OF THE DRAWINGS

FIGS. 16A and 16B are diagrams that contrast the print state of the dots, between the high image quality mode and the 2nd high speed mode.

DESCRIPTION OF THE EMBODIMENTS

Figure 1:
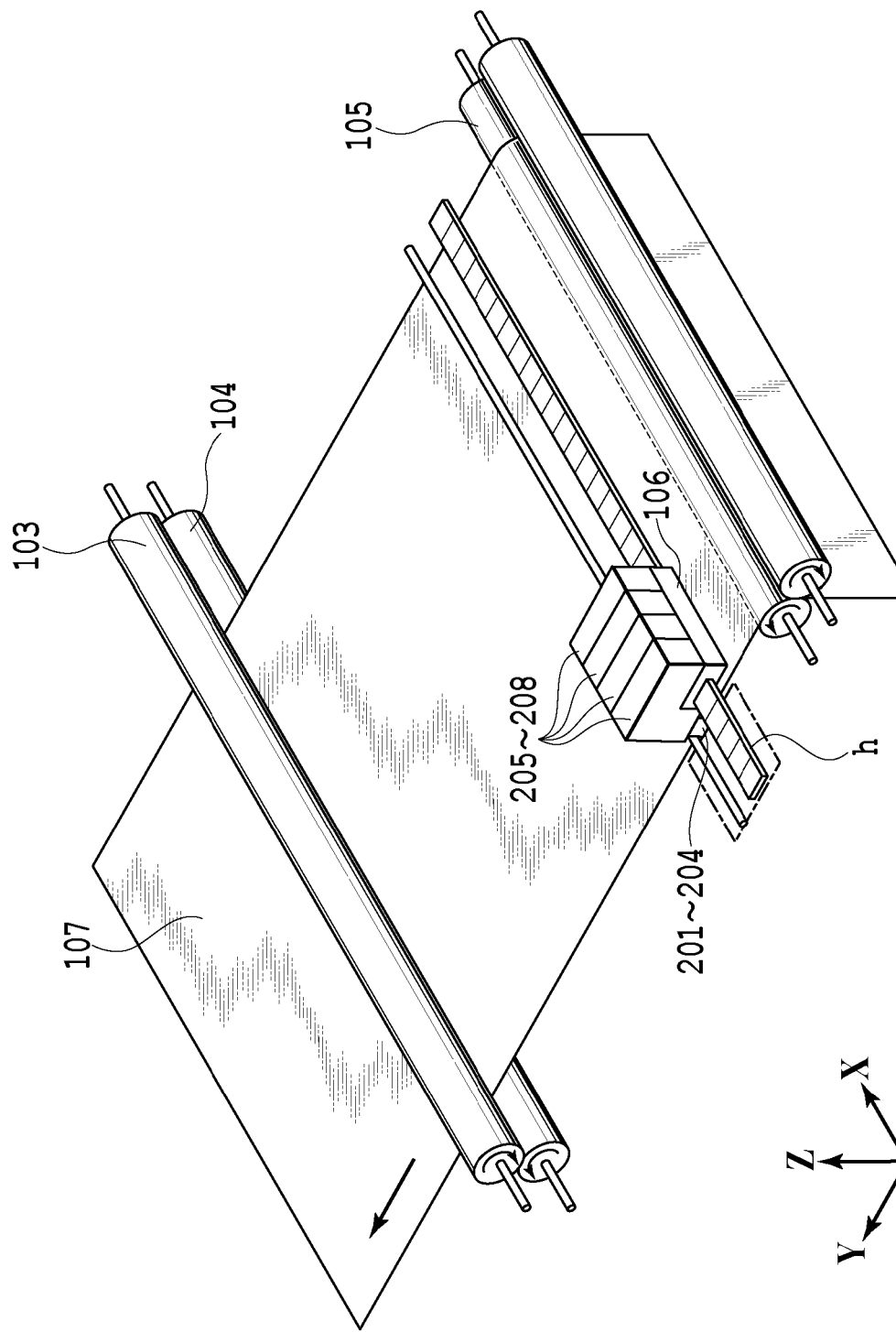
FIG. 1 is a schematic perspective view illustrating the structure of one embodiment of a color ink jet printing apparatus.

FIG. 1 is a schematic perspective view illustrating the structure of one embodiment of a color ink jet printing apparatus applicable to the invention. The ink tanks 205 to 208 respectively store 4 ink colors (black, cyan, magenta and yellow: K, C, M and Y), and these 4 ink colors are configured to be suppliable to the print heads 201 to 204. The print heads 201 to 204 are established to correspond to the 4 ink colors, and are configured to eject ink provided from ink tanks 205 to 208.

The conveyance roller 103 rotates to convey the print medium (a printing sheet) 107 while sandwiching the printing medium in conjunction with the support roller 104, and also serves the role of retaining the print medium 107. The carriage 106 is capable of mounting the ink tanks 205 to 208 and the print heads 201 to 204, and is configured to be able to move back and forth along the X direction while the print heads and ink tanks are mounted. Ink is ejected from the print heads during the back and forth movement of the carriage 106 and an image is formed on the print medium thereby. The carriage 106 is controlled such as to standby at the home position h denoted by the dotted line of the figure at times of non-print-operation such as a recovery operation of the print heads 201 to 204.

When a command to commence printing is input the print heads 201 to 204, waiting at the home position h shown in FIG. 1, print an image on the print medium 107 by ejecting ink while moving along with the carriage 106 in the X direction of the figure. Printing at an area having a width corresponding to the range in which the ejection ports of the print head 201 are aligned is carried out by 1 movement (scan) of the print head. When the printing accompanying 1 scan of the carriage 106 in the main scanning direction (X direction) is completed, the carriage 106 returns to the home position h, and printing is performed again by the print heads 201 to 204 while scanning in the X direction of the figure. The conveyance roller 103 rotates and the print medium is conveyed in a sub-scanning direction (Y direction), which crosses the main scanning direction, after the prior printing scan has completed and before the following printing scan has commenced. Printing of an image on the print medium 107 is completed by repeating printing scans of the print head and conveyances of the print medium in this manner. The printing operation that ejects ink from the print heads 201 to 204 is carried out according to regulations from the control unit to be described hereafter.

Note that in the above example explanation was made with respect to a case of a so-called one way printing that carries out a printing operation only at the time where the print head scans in the outward direction. The invention may also, however, be applied to an apparatus that performed so-called bi-directional printing where printing is performed in both directions, when the print head scans in the outward direction and when the print head scans in the inward direction. Note also that in the above example a structure is shown in which the ink tanks 205 to 208 and the print heads 201 to 204 are detachably mounted to the carriage 106. A configuration may also be employed in which a cartridge, in which the ink tanks 205 to 208 and the print heads 201 to 204 are integrated, is mounted to the carriage. A configuration may also be employed where a multiple color all in one head capable of ejecting multiple ink colors from one print head is mounted to the carriage.

Figure 2:
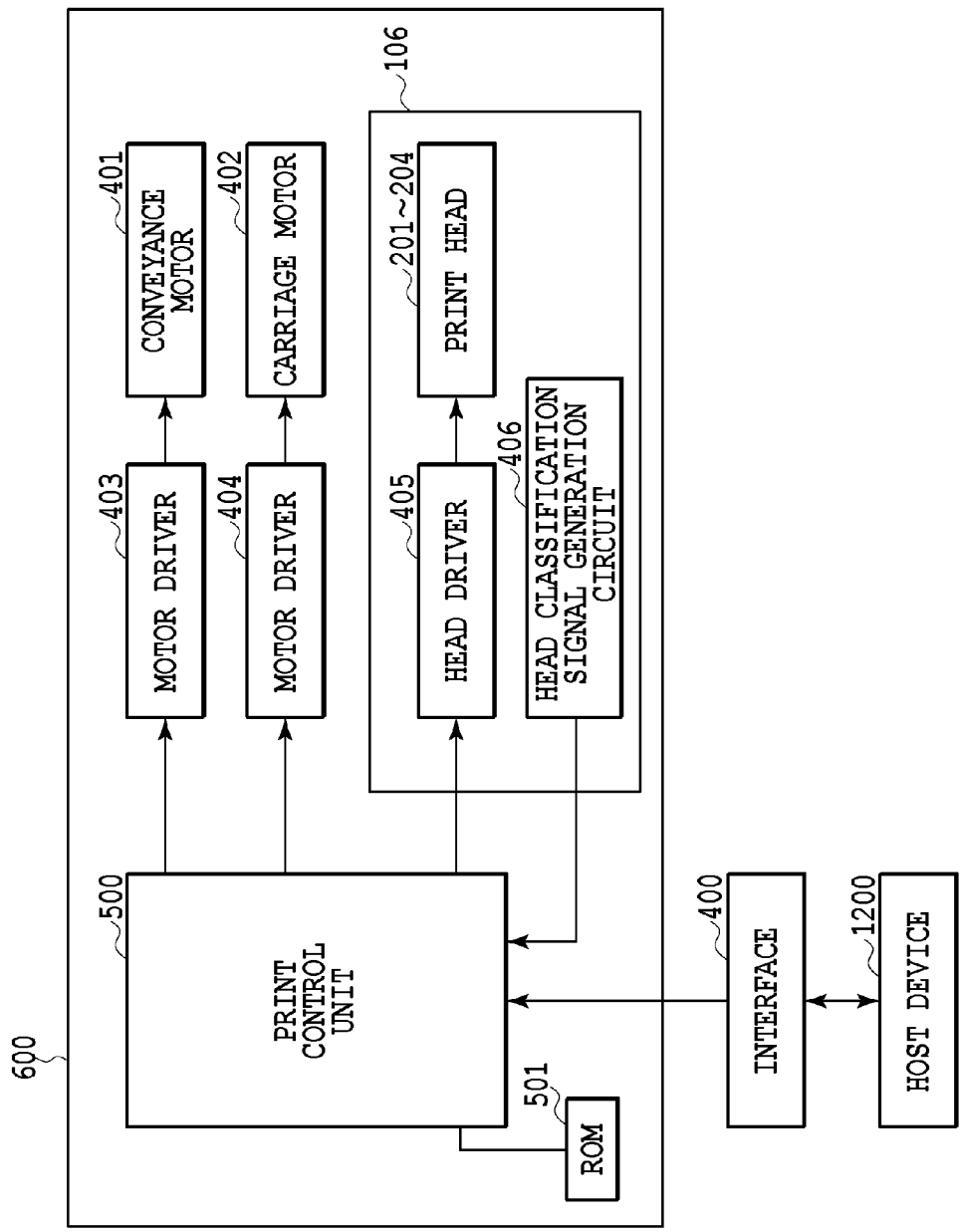
FIG. 2 is a block diagram illustrating the general configuration of a print control circuit.

FIG. 2 is a block diagram illustrating the general configuration of the print control circuit of the color ink jet printing apparatus shown at FIG. 1. The ink jet printing apparatus 600 is connected to a data supply device such as the host computer 1200 ("host PC") via the interface 400. Control signals, etc., which relate to image data sent from the data supply device and printing, are input into the print control unit 500 of the ink jet printing apparatus 600. The print control unit 500 performs prescribed processing of image data according to programs and later described mask patterns stored in the ROM 501, and generates print data capable of being used by the print heads 201 to 204. It also executes the printing operations based on the generated print data by controlling various mechanisms.

A conveyance motor 401 is provided for rotating the conveyance roller 103 in order to convey the print medium 107. A carriage motor 402 is provided for moving back and forth the carriage 106 that mounts the print heads 201 to 204. Motor drivers 403 and 404 are provided for driving the conveyance motor 401 and the carriage motor 402, respectively. 405 Head drivers 405 drives the print heads 201 to 204, and multiple of them are provided according to the number of print heads. A head kind signal generation circuit 406 supplies to the print control unit 500 signals that express the type and number of print heads 201 to 204 that are mounted in the carriage 106.

Figure 3:
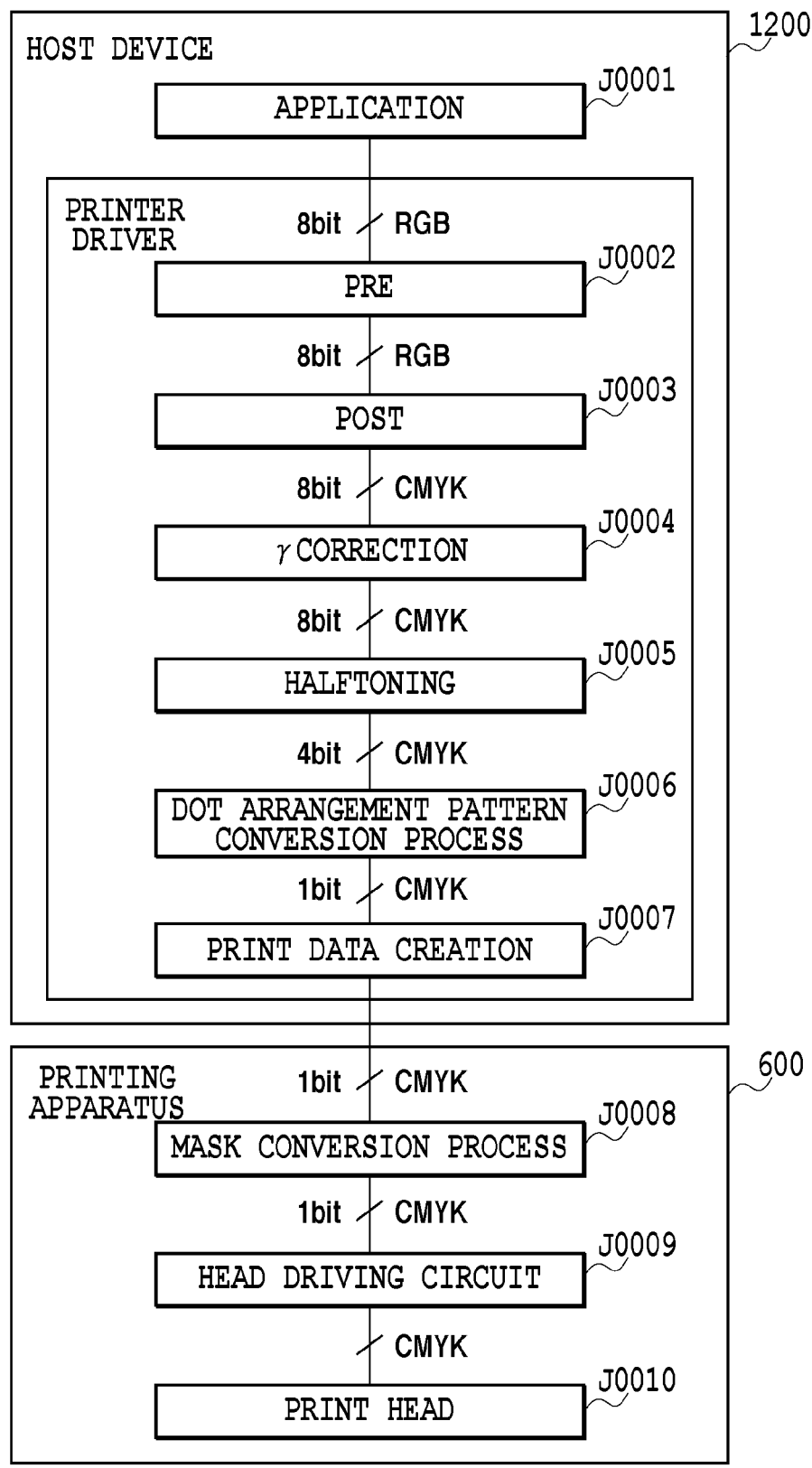
FIG. 3 is a block diagram for explaining the flow of an image data conversion process.

FIG. 3 is a block diagram for explaining the flow of the image data conversion process of this embodiment. The ink jet printing apparatus applicable to this embodiment performs printing with 4 basic colors: cyan, magenta, yellow and black. Thus a print head is provided that ejects these 4 ink colors. As shown at FIG. 3, each of the illustrated steps are configured by a printing apparatus and a host computer serving as a host device.

There is an application and a printer driver as programs that operate at the operating system of the host apparatus. Application J0001 generates image data with a resolution of 600 ppi (pixels per inch) and transmits it to the printer driver.

The print driver of this embodiment has, as its processes, a pre-process J0002, a post-process J0003, a γ correction process J0004, a halftoning process J0005, a dot arrangement pattern conversion process J0006, and a print data creation process J0007. Explaining each of the processes will be explained simply here. The pre-process J0002 performs color gamut mapping. It performs a data conversion for mapping a color gamut expressed as RGB image data of a standard sRGB color space to the color gamut expressed by the printing apparatus. More specifically, R, G and B data, each expressed with 8-bits, is converted to R, G, and B 8-bit data with different content.

The post-process J0003 performs, based on the RGB data generated by the above color gamut mapping, a process that obtains data separated into C, M, Y and K data that corresponds to an ink combination that reproduces the colors expressed by the RGB data. In the same manner as the pre-process, the post-process J0003 is performed by making use of a 3D LUT and an interpolation.

The γ correction J0004 performs a gradation level change for each color of the separated color data obtained by the post-process J0003. Specifically, by using a 1D LUT corresponding to the gradient characteristics of each ink color of the printing apparatus the above described 8-bit separated color data is converted into multi-value (8-bit) gradation data such as to linearly associate it with the gradation characteristics of the printing apparatus.

The processes below perform the same process for each of the printing colors of the printing apparatus. In this example, because the printing apparatus has 4 printing colors, C, M, Y and K, either the same process is performed 4 times, or 4 of the same process are carried out in parallel.

The halftoning process J0005 performs a quantization in which 8-bit gradation data with a resolution of 600 ppi is converted to 4-bit gradation data. In this embodiment 256 grade 8-bit data having a resolution of 600 ppi is converted to 9 grade 4-bit data having a resolution of 600 ppi. The 4-bit data is data that becomes an index for representing the arrangement pattern at the dot arrangement pattern conversion process J0006.

The pre-process J0002 to the dot arrangement pattern conversion process J0006 are normally performed independently in accordance with the printing mode. This is because even in the case where the same ink combination is printed at the same rate the colors reproduced on the print medium vary depending upon the type of print medium, etc. As such, in order to reproduce the image created by the application as faithfully as possible, it was necessary to perform a different image process for each printing mode. More specifically, the above described table, for performing the pre-process J0002, the post-process J0003 and the γ correction J0004, is prepared for each printing mode, and the halftoning method and the parameters for processing, etc., are different for each printing mode.

In the present embodiment, however, the above processes are made common with respect to the high speed mode and high image quality mode relating to the same printing medium. That is, the table for performing the pre-process J0002, the post-process J0003 and the γ correction J0004, and the halftoning method and the parameters for processing, are used in common between these two modes.

In this embodiment the following dot arrangement pattern conversion process J0006, and the processes thereafter, are configured to be different at the high image quality mode and the high speed mode. The dot arrangement pattern J0006 is explained simply below.

The above described halftoning process lowers the level number of the 256 value multi-value density information (8-bit data), having a resolution of 600 ppi, such that it becomes 9 value gradation value data (4-bit data). However, the information that the ink jet printing apparatus of this embodiment can actually print is binary information that indicates whether ink is to be printed, or not printed. The dot arrangement pattern conversion process functions to lower a multi-value level of 0 to 8 to a binary level that determines the presence or absence of a dot. Concretely, at the dot arrangement pattern conversion process J0007, dot arrangement patterns that correspond to each pixel's gradation value (level 0 to 8), are assigned to each pixel, which are expressed as level 0 to 8, 4-bit data that are values output from the halftone processing unit. Accordingly, dot ON or OFF is defined at each of the multiple areas inside 1 pixel, and 1 or 0 one-bit output data is allocated to each of the areas inside 1 pixel. In this embodiment such dot arrangement patterns are made to differ for the high image quality mode and the high speed mode.

Figure 4:
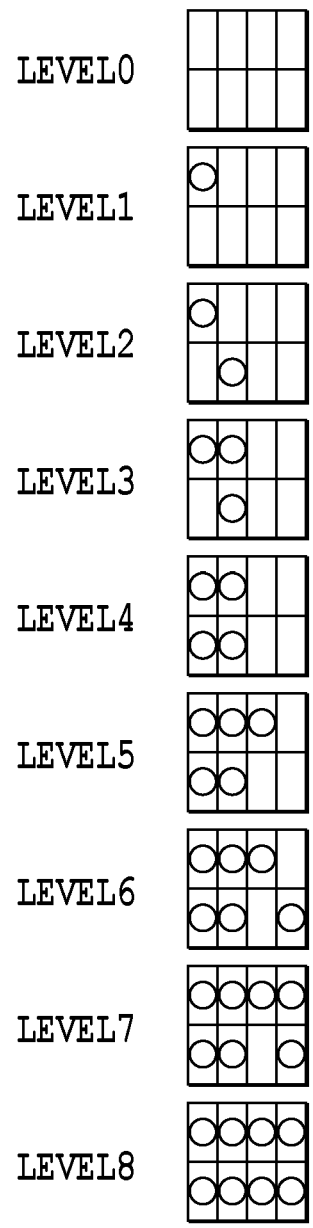
FIG. 4 is a diagram that illustrates a dot arrangement pattern conversion process of a high image quality mode.

FIG. 4 illustrates output patterns with respect to input levels 0 to 8 (9 value), which are converted at the dot arrangement pattern conversion process of the high image quality mode of this embodiment. Each of the level values shown at the left of the figure correspond to level 0 to level 8, which are output values from the halftone processing unit. The 8 area regions on the right side of the figure, comprising a 4 (horizontal) by 2 (vertical) area, correspond to 1 pixel region output by the halftone process, and have a size that corresponds to an image resolution of 600 ppi (pixels/inch, a reference value) both horizontally and vertically. These regions will be referred to as "pixel regions" hereafter. Each area inside a pixel region corresponds to the smallest unit for which dot ON/OFF is defined, and has a print resolution of 1200 dpi (dots/inch, a reference value) vertically and 2400 dpi horizontally. The vertical direction is the Y direction in which the ejection ports of the print head are aligned, and the alignment pitch of the areas, as well as the arrangement pitch of the nozzles, equate to a value of 1200 dpi. The horizontal direction is the X direction, which corresponds to the scanning direction of the print head, and in the high image quality mode of this embodiment the printing head is configured to perform printing at a density of 2400 dpi. In the high image quality mode of this embodiment binary data (2nd binary data), corresponding to each area, is generated by relating the input level value K (9) to the (K-1) areas (8 areas) in this way. Note that the printing apparatus of this embodiment is designed such that one 2 pl ink drop is printed at 1 area represented by a height of approximately 20 µm and a width of approximately 10 µm that corresponds to the printing resolution of such high image quality mode, and a prescribed density can be obtained.

In the figure, the areas at which a circle is entered represent areas in which a dot is printed, and areas at which dots are printed increase one by one in accordance with the increase in level number. As for the high image quality mode of this embodiment, it is possible to realize a configuration in which pixel region density increases according to level value by way of providing dot arrangement patterns such as these.

Figure 5:
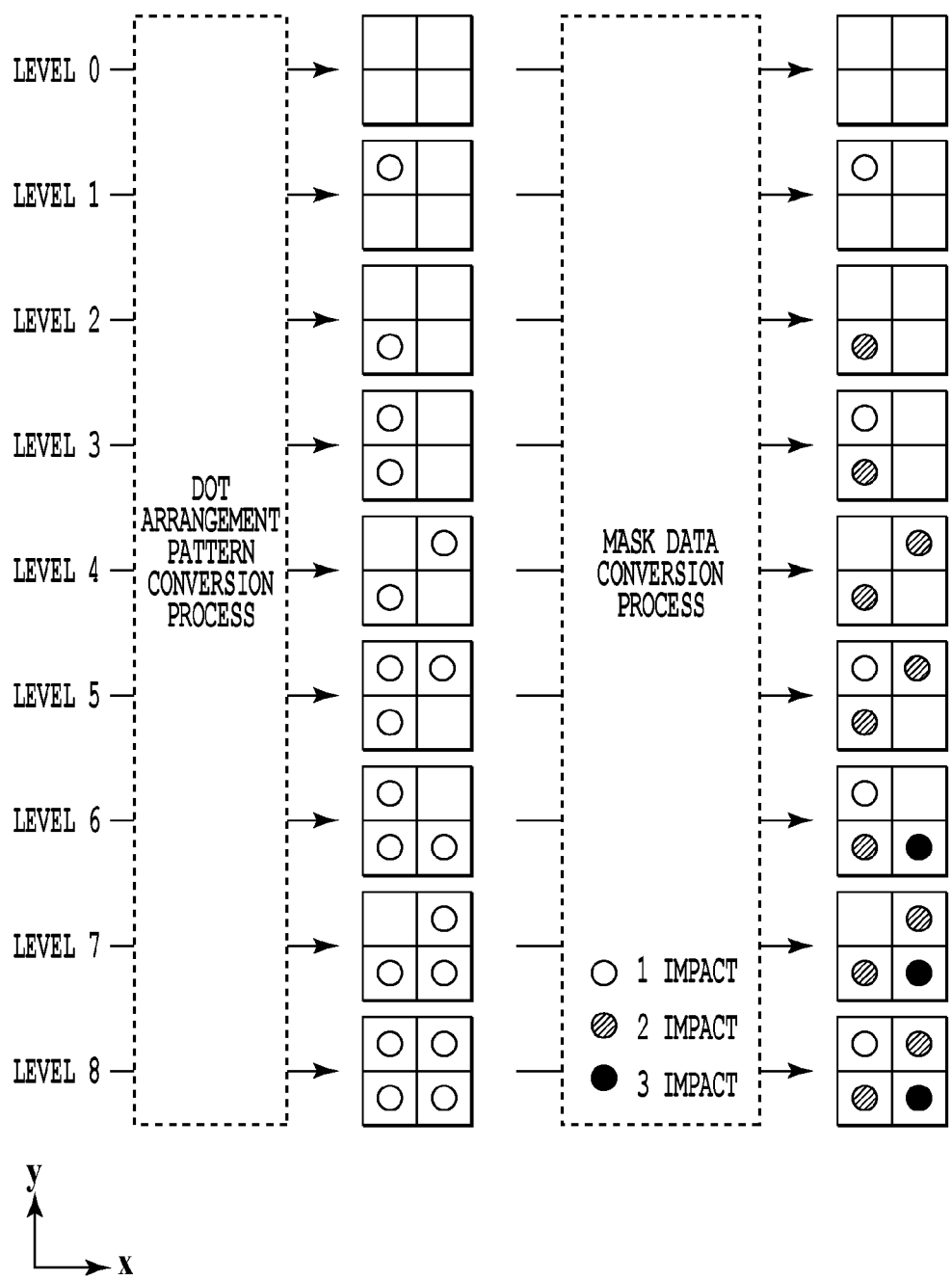
FIG. 5 is a diagram that illustrates a dot arrangement pattern conversion process of a high speed mode.

On the other hand, FIG. 5 illustrates output patterns with respect to input levels 0 to 8, which are converted at the dot arrangement pattern conversion process of the high speed mode of this embodiment. As for the high speed mode of this embodiment, 9 value input data is converted by the dot arrangement pattern conversion process into binary data comprising a 2 (vertical) by 2 (horizontal) area having 1200 ppi in both the horizontal and vertical direction. Similarly to FIG. 4, the areas marked with a circle represent areas at which the dots is printed. As for the high speed mode, however, the areas at which dots are printed do not necessarily increase as the level increases. For example, as for level 1 and level 2, although the location of the area where the dot is printed is changed, the number of areas where a dot is printing has not changed. Levels 3 and 4, and levels 5, 6, and 7 have the same relationship. That is, in the high speed mode of this embodiment a configuration wherein density of a pixel region increases according to level value of the pixel region is not sufficiently attained only by the dot arrangement patterns. In the high speed mode of this embodiment binary data (1st binary data) corresponding to each area, is generated by relating the input level value K (9) to J areas (4 areas) that is less than (K-1).

Returning to the block diagram of FIG. 3, at the final process carried out at the printer driver, print data is generated, by the print data generation process J0007, which has various print control information added to the image data comprising the binary data obtained after the above described dot arrangement pattern conversion process. The printer driver then transmits the print data created as such to the printing apparatus.

The printing apparatus performs a mask data conversion process J0008 with respect to the above described input print data. In this embodiment a 4-pass mask pattern is prepared in order to perform a 4-pass multi-pass printing at the high image quality mode. On the other hand a 3-pass mask pattern is prepared in order to perform a 3-pass multi-pass printing at the high speed mode. Note that a multi-pass printing is a printing method that completes an image in steps by scanning a print head a plurality of times over the same region of the print medium. Thus the mask patterns are binary data for deciding at a masking process which data is permitted to be printed at the respective print scans.

Figure 6:
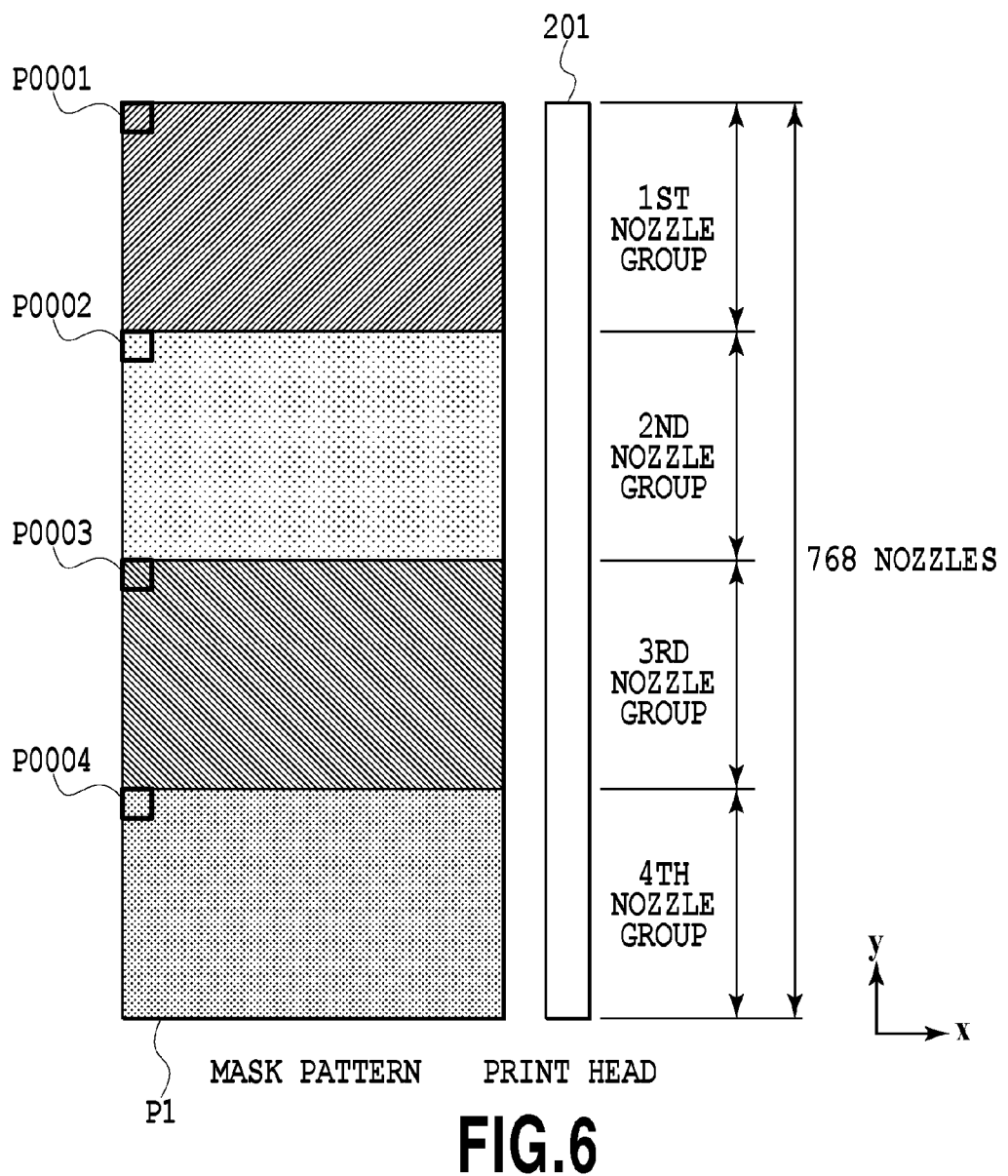
FIG. 6 is a schematic view to explain a mask pattern P1 used at the high image quality mode.

FIG. 6 is a schematic view to explain the mask pattern P1 (2nd mask pattern) used at the high image quality mode. Here, among the print heads 201 to 204 for different 4 color ink, a mask pattern P1 for a print head 201 of 1 color is shown. The mask patterns for the other print heads 201 to 204 are the same.

The mask pattern P1 comprises 256 areas in the X direction (the main scanning direction) and 768 areas, the same as the number of nozzles, in the Y direction (the sub-scanning direction), and is an aggregation of binary data that defines, with respect to each individual area, whether a dot is permitted to be printed, or not permitted to be printed. In the case of 4-pass multi-pass printing, each time the print head 201 performs 1 scan in the main scanning direction the print medium is conveyed, in the sub-scanning direction, a distance equivalent to 192 nozzles, which is ¼ of all of the nozzles. Accordingly, 4 print scans are performed by 4 nozzle groups at a unit area of the print medium corresponding to 1 nozzle group. Here, the 768 nozzles of the print head 201 can be considered as 4 groups of 192 nozzles each, and at the high image quality mode of this embodiment the mask patterns of the 4 nozzle groups are configured such has to have an exclusive and complementary relationship with each other.

Figure 7:
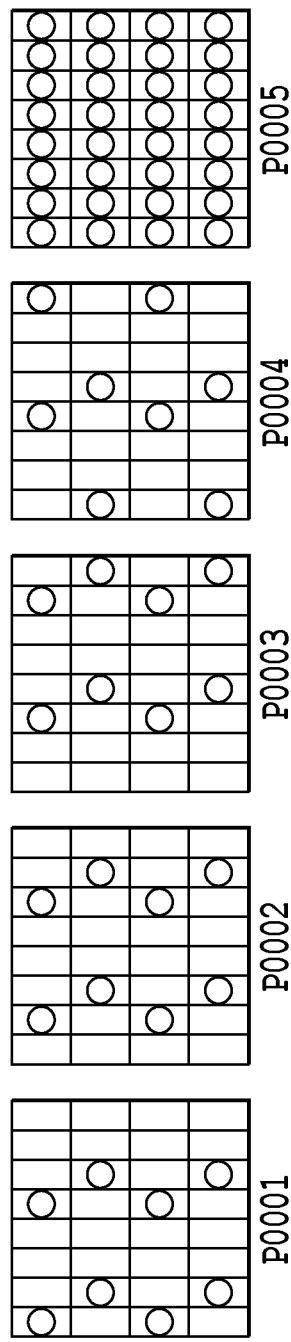
FIG. 7 is a schematic view to explain a mask pattern P1 used at the high image quality mode.

FIG. 7 is a diagram that illustrates the upper left 8×4 region (P0001 to P0004) of the mask patterns that correspond respectively to the 4 nozzle groups. Each area corresponds to 1 pixel with a main scanning direction dpi of 2400 and a sub-scanning direction dpi of 1200. The areas marked with are those where a dot is permitted to be printed and the blank areas are those where a dot is not permitted to be printed. P0001 to P0004 have an exclusive and complementary relationship with each other, and by superimposing them (P0005) it can be seen that a dot is permitted to be printed once at each of the areas of the 8×4 region.

That is, the printing of an 8×4 unit area is completed by repeating print scans according to ejection data (2nd ejection data) generated by using such mask patterns P0001 to P0004 and operations where the print medium is conveyed a distance equivalent to 192 nozzles. In this manner the mask pattern for the high image quality mode, in a 4-pass multi-pass printing, is configured to have a 100% print allowance ratio with respect to a 2400 dpi×1200 dpi unit area.

Figure 8:
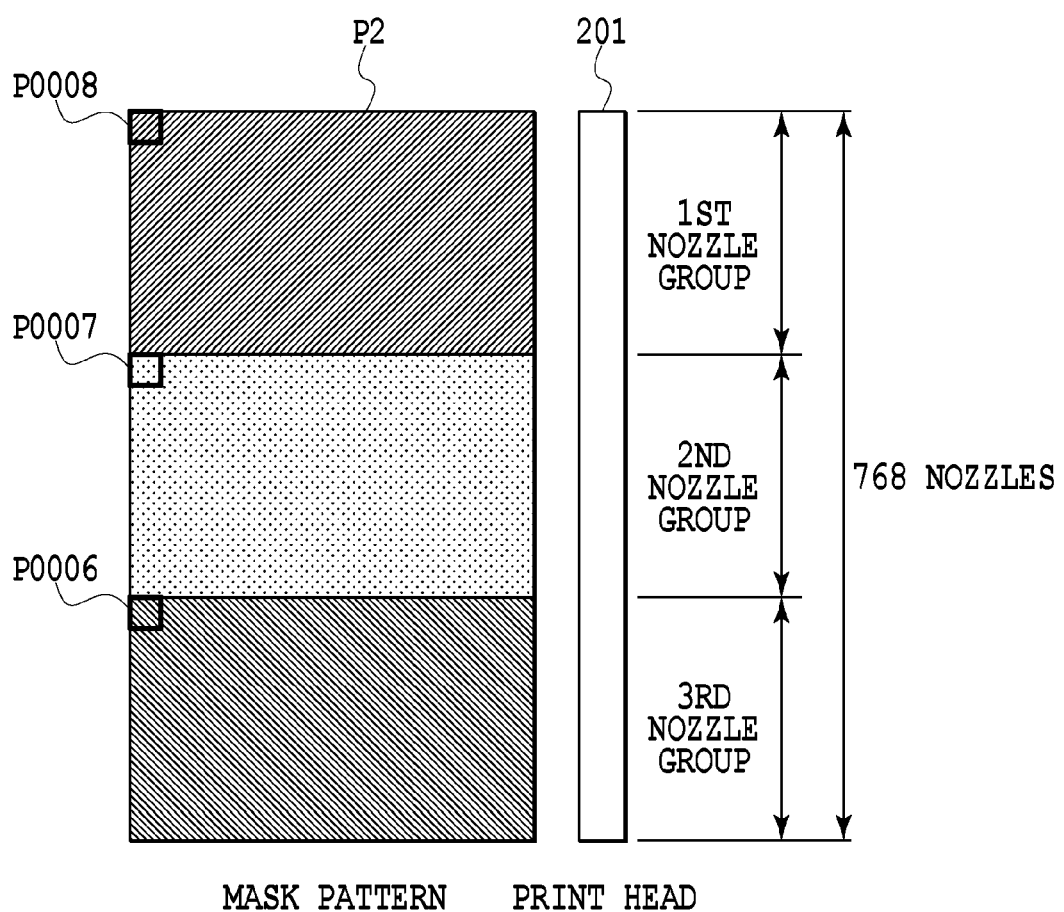
FIG. 8 is a schematic view to explain a mask pattern P2 used at the high speed mode.

On the other hand, FIG. 8 is a schematic view to explain the mask pattern P2 (1st mask pattern) used at the high speed mode of this embodiment. Mask pattern P2 also comprises 256 areas in the X direction and 768 areas, the same as the number of nozzles, in the Y direction. In the case of 3-pass multi-pass printing, each time the print head 201 performs 1 scan in the main scanning direction the print medium is conveyed, in the sub-scanning direction, a distance equivalent to 256 nozzles, which is ⅓ of all of the nozzles. Accordingly, 3 print scans are performed by 3 nozzle groups at a unit area of the print medium corresponding to 1 nozzle group. Here, the 768 nozzles of the print head 201 can be considered as 3 groups of 256 nozzles each. However, as for the high speed mode of this embodiment, the mask patterns of the 3 nozzle groups do not have an exclusive relationship with respect to each other, that is, there are areas where the printing of overlapping dots is permitted.

Figure 9:
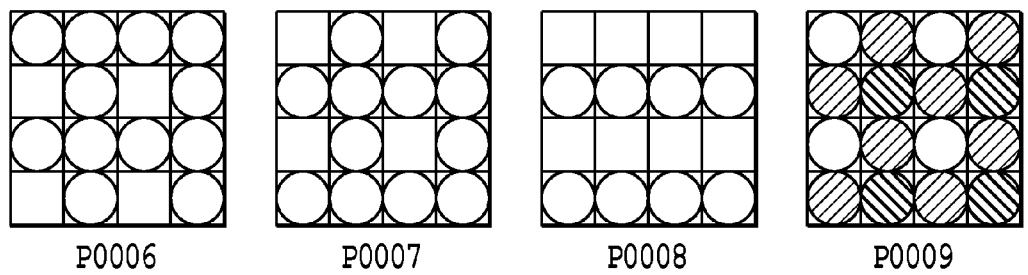
FIG. 9 is a schematic view to explain a mask pattern P2 used at the high speed mode.
Figure 9:
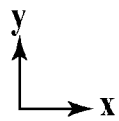

FIG. 9 is a diagram that illustrates the upper left 4×4 region (P0006 to P0008) of the mask patterns that correspond respectively to the 3 nozzle groups, and the result of superimposing these mask patterns (P0009). A dot pattern such as that of P0009 is printed on the print medium by way of repeating print scans according to ejection data (1st ejection data) created using mask patterns (P0006 to P0008).

In the case of the mask pattern for the high speed mode, each area corresponds to 1 pixel having 1200 dpi in the X direction and 1200 dpi in the Y direction. In accordance with P0009 it can be understood that areas at which 1, 2 and 3 dots are printed are intermixed. It can also be understood that, at each of the individual patterns, a grouping wherein a 2 area by 2 area section, corresponding to one pixel region of 600 ppi, is considered a unit, repeats systematically. In this manner the high speed mode of this embodiment is configured such that there is a print permission ratio larger than 100% at a 1200 dpi×1200 dpi unit area, and ink drops are printed by a maximum of 8 dots at 1 pixel region.

In this embodiment the mask patterns shown at FIG. 7 and FIG. 8, as well as the multiple mask patterns applied at the other print modes, are stored as binary data at the ROM 501 inside the main body of the printing apparatus. Thus referring again to FIG. 3, at the mask data conversion process J0008, one mask pattern is chosen among the plurality of mask patterns according to the specified printing mode, and a logical AND operation is performed between the applicable mask pattern and the binary data generated at the above described dot arrangement pattern conversion process. Based on this the print pixels at which a dot is actually to be printed is determined for each printing scan, and this is input as a 1 bit output signal into the drive circuit J0009 of the print head 201.

The 1-bit data, of each color, input into the driving circuit J0009, is converted into a driving pulse for the print head 201, and ink is ejected by the respective print heads at a prescribed timing. More concretely, at the high image quality mode of this embodiment, a printing scan is carried out in which the ejection frequency of the print head 201 and the moving speed of the carriage 106 are associated, such that dots are printed at a print resolution of 2400 dpi in the main scanning direction. On the other hand, at the high speed mode, a printing scan is carried out in which the ejection frequency of the print head 201 and the moving speed of the carriage 106 are associated, such that dots are printed at a print resolution of 1200 dpi in the main scanning direction. Note that here the above described mask data conversion processes of the printing apparatus are executed under the control of the print control unit 500, which comprises the control unit of the printing apparatus, using a circuit dedicated to them.

Figure 10:
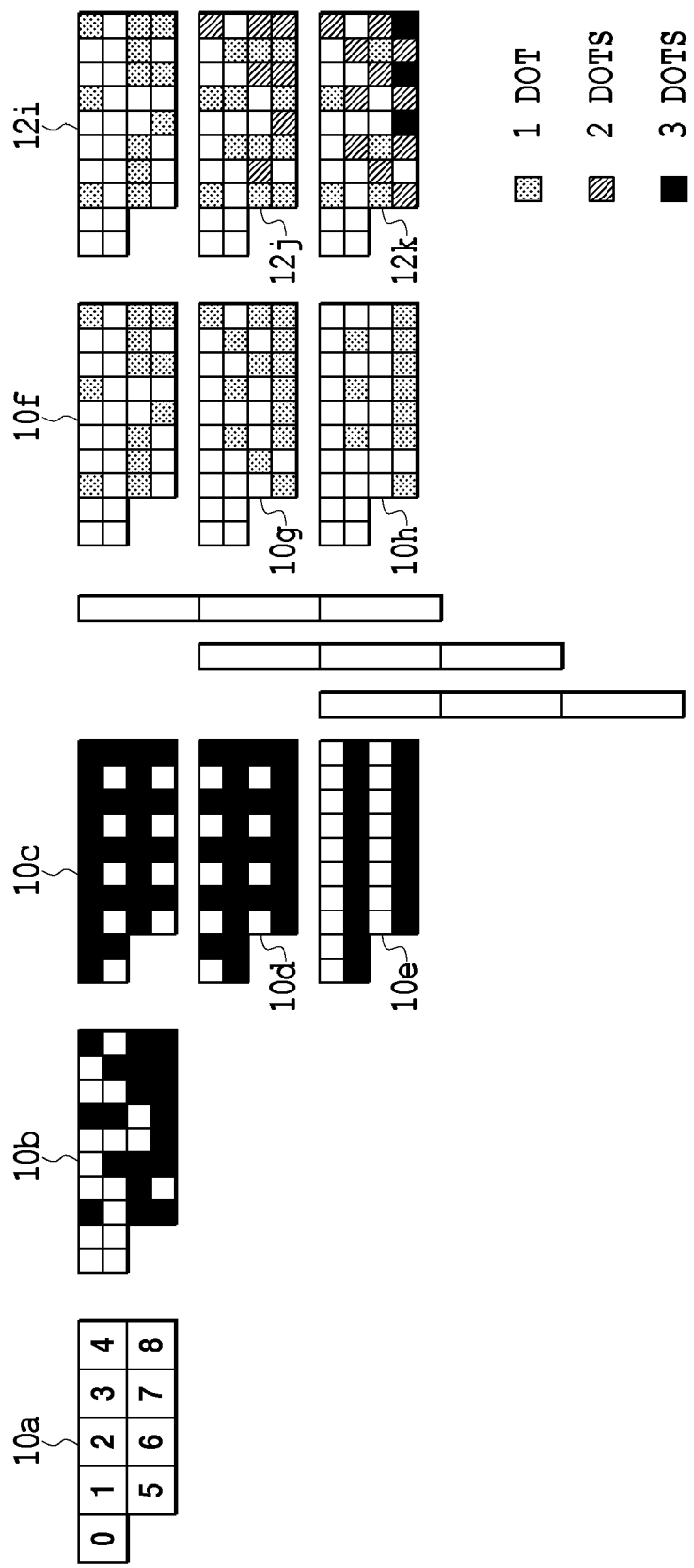
FIG. 10 is a diagram for concretely explaining the course of the image processing at the high speed mode.

FIG. 10 is a diagram for concretely explaining the course of the process of the high speed mode of this embodiment, the process relating to the 9 level data after the halftoning process J0005. Here, 10*a* illustrates 9 value image data output from the halftoning process J0005. An example is illustrated where 9 pixels of 600 ppi having values from level 0 to level 8 was input. Here, 10*b* shows binary data that is the result of the 9 level data 10*a* being converted by the dot pattern conversion process shown at FIG. 5. The black areas indicate areas where a dot is printed and the white areas indicate areas where a dot is not printed.

Then, 10*c* to 10*e* are 3-pass mask patterns prepared by the mask data conversion process. In these figures the black areas indicate areas where a dot is permitted to be printed and the white areas indicate areas where a dot is not permitted to be printed. Here, 10*c* is the mask pattern P006 used at the 1st pass (the 1st scan) with respect to the unit area, 10*d* is the mask pattern P0007 used at the 2nd pass, and 10*e* is the mask pattern P0008 used at the 3rd pass.

On the other hand, 10*f* to 10*h* show binary data that is the result obtained from performing a logical AND operation between the binary data 10*b* and the respective mask patterns 10*c* to 10*e*. Here, 10*f* shows the result of a logical AND operation between the binary data 10*b* and the mask data 10*c* of the 1st pass, and is the binary data that is actually printed on the unit area of the print medium at the 1st pass. Here, the printed areas are shown in grey. Printed state 12*i* represents the printed state of the unit area after the completion of the 1st pass.

Next, 10*g* shows the result of a logical AND operation between the binary data 10*b* and the mask data 10*d* of the 2nd pass and is the binary data that is printed on the unit area of the print medium at the 2nd pass. Because the printing of the 2nd pass is performed after the printing of the first pass has already been performed, areas occur at the unit area where 2 overlapping dots are printed, as shown at 12*j*.

Furthermore, 10*h* shows the result of a logical AND operation between the binary data 10*b* and the mask data 10*e* of the 3rd pass and is the binary data that is printed on the unit area of the print medium at the 3rd pass. The printing of the 3rd pass is performed at the area where the printings of the first pass and the 2nd pass have already been performed. Thus, regarding the printing status of the unit area, as shown at 12*k*, areas occur where 2 overlapping dots are printed, and areas also occur where 3 overlapping dots are printed.

Figures 11A, 11B:
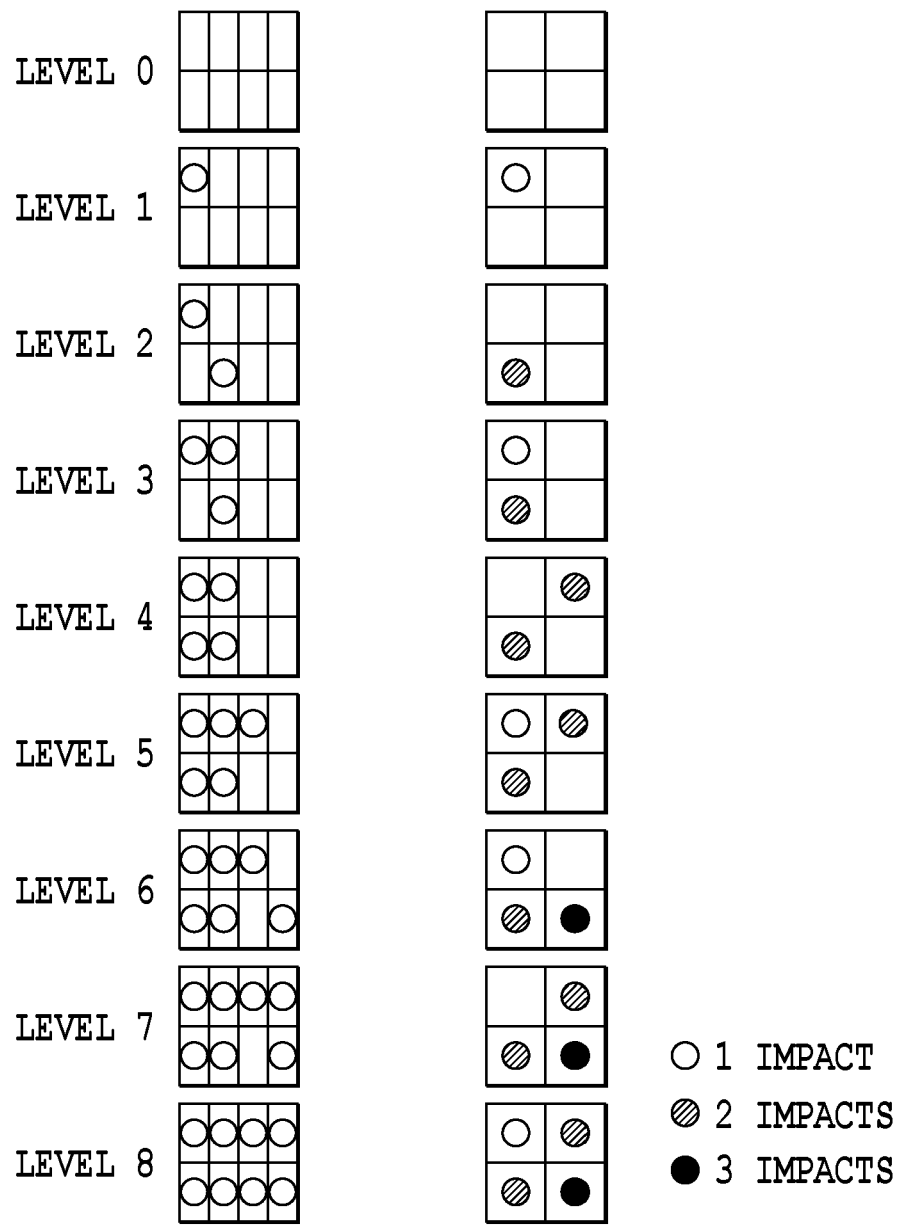
FIGS. 11A and 11B are diagrams for contrasting the print state of the dots at 1 pixel region, between the high image quality mode and the high speed mode.

FIGS. 11A and 11B are diagrams for contrasting the 9 level data after the halftoning process J0005 and the print state of the dots on the print medium of this embodiment, between the high image quality mode and the high speed mode.

FIG. 11A is a diagram that illustrates the dot printing state of the high image quality mode. That is, the figure illustrates the print state of the dots that can be obtained on the print medium as the result of performing the dot arrangement pattern conversion process explained at FIG. 4 with respect to 9 level data after the halftoning process J0005, and a performing a 4-pass printing using the mask pattern explained at FIG. 7. Dots increase one by one at each 4×2 area as the number of levels that one 600 ppi pixel has increases, and at the highest level 8, a total of 8 dots are printed at 1 pixel region.

On the other hand, FIG. 11B is a diagram that illustrates the dot printing state of the high speed mode. That is, the figure illustrates the print state of the dots that can be obtained on the print medium as the result of performing the dot arrangement pattern conversion process explained at FIG. 5 with respect to 9 level data after the halftoning process J0005, and performing a 3-pass printing using the mask pattern explained at FIG. 9. As for the high speed mode as well, the number of dots increase one by one, at the area corresponding to one 600 ppi pixel comprising a 2×2 area, as the level increases, but while also permitting overlapping to occur, and at the highest level 8 a total of 8 dots are printed at the pixel region. That is, the relationship between the level value and the dot count is the same as that of the high image quality mode.

In the high speed mode of this embodiment, as explained at FIG. 9, the areas at which 1, 2 and 3 dots are to be printed on a 2 area by 2 area region corresponding to one 600 ppi pixel are determined in advance by a mask pattern. Thus it is possible to control the number of dots that are eventually printed at the pixel region by way of the dot arrangement pattern conversion process designating, according to level, whether a dot is to be disposed at any of these areas. In this way, at the high speed mode of this embodiment, the dot arrangement pattern referenced at the dot arrangement pattern conversion process and the mask pattern referenced at the mask data conversion process are associated and created in advance. Accordingly, even in the case of a low resolution printing mode that only has a number of areas (4), which is lower than the level value (9), it is possible to cause a one to one correspondence between the level value (level 0 to level 8) and the number of dots eventually printed (0 dots to 8 dots) and perform printing.

As described above, image processing up to the halftoning process is the same at the high image quality mode and the high speed mode of this embodiment, however, the dot arrangement pattern conversion process and the mask data conversion process, as well as the printing resolutions differ with respect to each other.

Concretely, first in the dot arrangement pattern conversion process, at the high image quality mode one 600 ppi pixel is converted into 4×2 binary data, while on the other hand at the high speed mode one 600 ppi pixel is converted into 2×2 binary data. That is, at the high speed mode the quantity of information after conversion is smaller, and it is possible to expect high speed conversion processing. Also, in the mask data conversion process, at the high image quality mode a 4-pass mask pattern is used in which the print permission ratio is 100% (in other words, there is a complementary relationship between each of the nozzle groups), while at the high speed mode a 3-pass mask pattern having a print permission ratio of 200% is used. Furthermore, at the high image quality mode printing is carried out at a resolution of 2400 dpi in the main scanning direction, while at the high speed mode printing is carried out at a print resolution of 1200 dpi, corresponding to half of that of the high image quality mode. Here, at the high speed mode, because the print resolution is half of that of the high image quality mode, it is possible to set the carriage speed faster than that of the high image quality mode, while in a state where the ejection frequency of the print head 201 is the same as that of the high image quality mode.

Moreover, at the high speed mode of this embodiment, by way of providing associated dot arrangement patterns and mask patterns in advance, there is a linear relationship between level value and dot count although printing is performed at a low resolution having only a number of areas lower than the level value. Accordingly, it is possible to implement a mode that can output at a high speed, in which it is possible to obtain gradation characteristics and an image density that is the same as that of the high image quality mode while having the processes up to the halftoning process common with the high image quality mode. That is, with the high speed mode of this embodiment it is possible to achieve gradation characteristics that are favorable to those of Japanese Patent No. 4502362 while it is not necessary to independently prepare a color profile and a quantization program for the high speed mode such as Japanese Patent No. 4502362.

Note that while an example was explained above wherein a mask pattern and a dot arrangement pattern in which 1 pixel region (2 areas×2 areas) were set as 1 period were prepared, the embodiments of the invention are not limited to such a configuration. Specifically, at the same level 1, the area of the dot arrangement pattern at which a dot is printed is not limited to the upper left area of the 2×2 region, as shown at FIG. 5; it may be changed in various ways according to the position of the 600 ppi pixel, such as to the upper right or lower left area of the region. With such dot arrangement patterns as well a rule should be followed wherein, with the collaboration of the mask pattern, 1 dot is effectively printed at any of the 2×2 areas in the case of level 1, 2 dots are printed at any of the 2×2 areas in the case of level 2, and so forth. That is, the respective patterns are not limited to any particular period as long as the dot arrangement patterns and the mask patterns are associated such that there is a one to one correspondence between the level value had by the pixel region and the number of dots effectively printed within the pixel region.

The resolution of the pixel region and the print resolution, as well as the gradation number (level value) are also not limited to the values set forth above. In the present embodiments it is acceptable to prepare a dot arrangement pattern that defines the presence or absence of a printed dots with respect to a number of areas (J areas) less than the level value (K)-1, and to prepare a mask pattern by which the sum of the dots that are permitted to be printed by a multi-pass printing in the pixel region is K-1. That is, it is possible to obtain the same effect as the above described configuration if the dot arrangement patterns and the mask patterns are associated and created such that there is a one to one linear correspondence between level value and the number of dots effectively printed at the pixel region.

Furthermore, with respect to the number of multiple passes as well, as long as the number of multiple passes N is an integer of 2 or larger, the invention is not limited to the configuration set forth above. The effect of the invention is available if a low resolution, high speed mode (1st mode) that prints an image by N number of passes, and a high resolution, high image quality mode (2nd mode) that prints an image by M number of passes (where M>N), are prepared, and the above described image processing relationship is maintained between them.

The printing apparatus of the above embodiment receives binarized data and performs of the mask data conversion process, however, the received binary data is not necessarily limited to be received through a printer driver such as that explained at FIG. 3. That is, even if there is not a print driver particular to the printing apparatus and 1200 dpi binary data that has been processed by some sort of method is input, the printing apparatus of the above embodiment can deal with the data at a 1200 dpi print resolution. This type of mode will be referred to here as the 2nd high speed mode in order to distinguish it from the above described 1st high speed mode. In the case of the 2nd high speed mode, there is not image processing information before the binarization for the printing apparatus side, and it is also not possible to prepare a mask pattern that corresponds to the dot arrangement pattern conversion process as per the 1st high speed mode described above.

Figure 12:
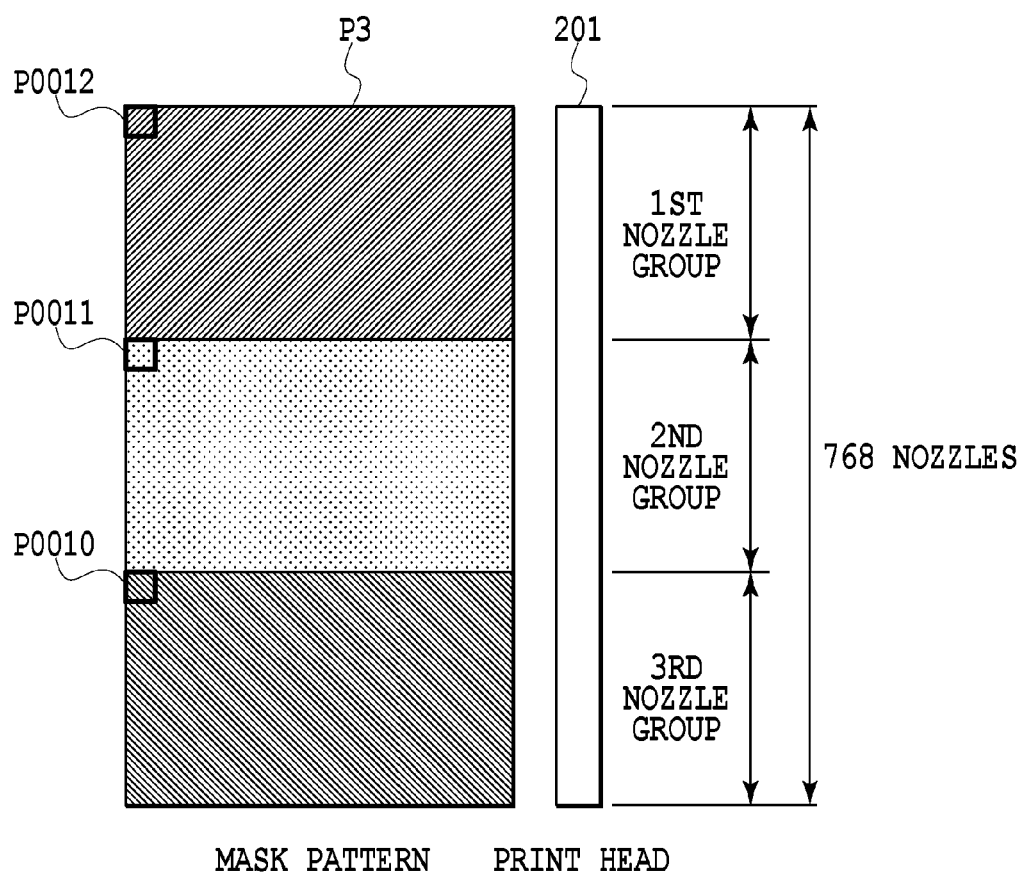
FIG. 12 is a figure that illustrates a mask pattern P3 used at a 2nd high speed mode.

FIG. 12 is a figure that illustrates the mask pattern P3 used at the 2nd high speed mode. The mask pattern P3 is also a 3-pass mask pattern comprising 256 areas in the X direction and 768 areas, the same as the number of nozzles, in the Y direction.

Figure 13:
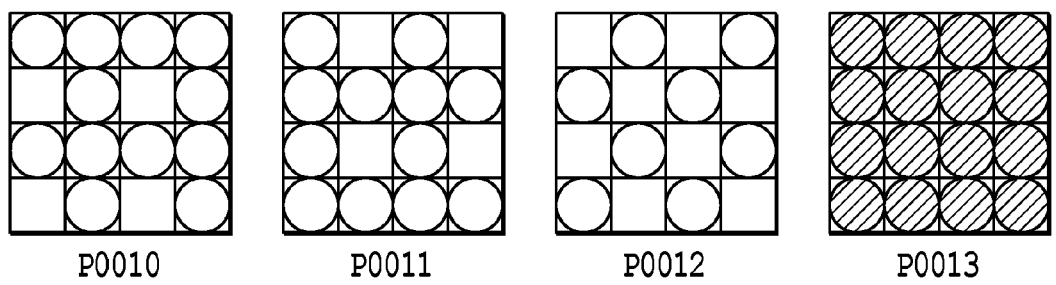
FIG. 13 illustrates the result of superimposing the mask patterns of 3 nozzle groups.

FIG. 13 is a diagram that illustrates the upper left 4×4 region (P0010 to P0012) of the mask patterns that correspond respectively to the 3 nozzle groups, and the result of superimposing these mask patterns (P0013). At the 2nd printing mode mask patterns P0010 to P0012 are established such that 2 dots are permitted to be printed at all areas of the 4×4 region. In this manner the 2nd high speed mode of this embodiment is configured such that a maximum of 8 dots are printed at one 600 ppi pixel.

Figure 14:
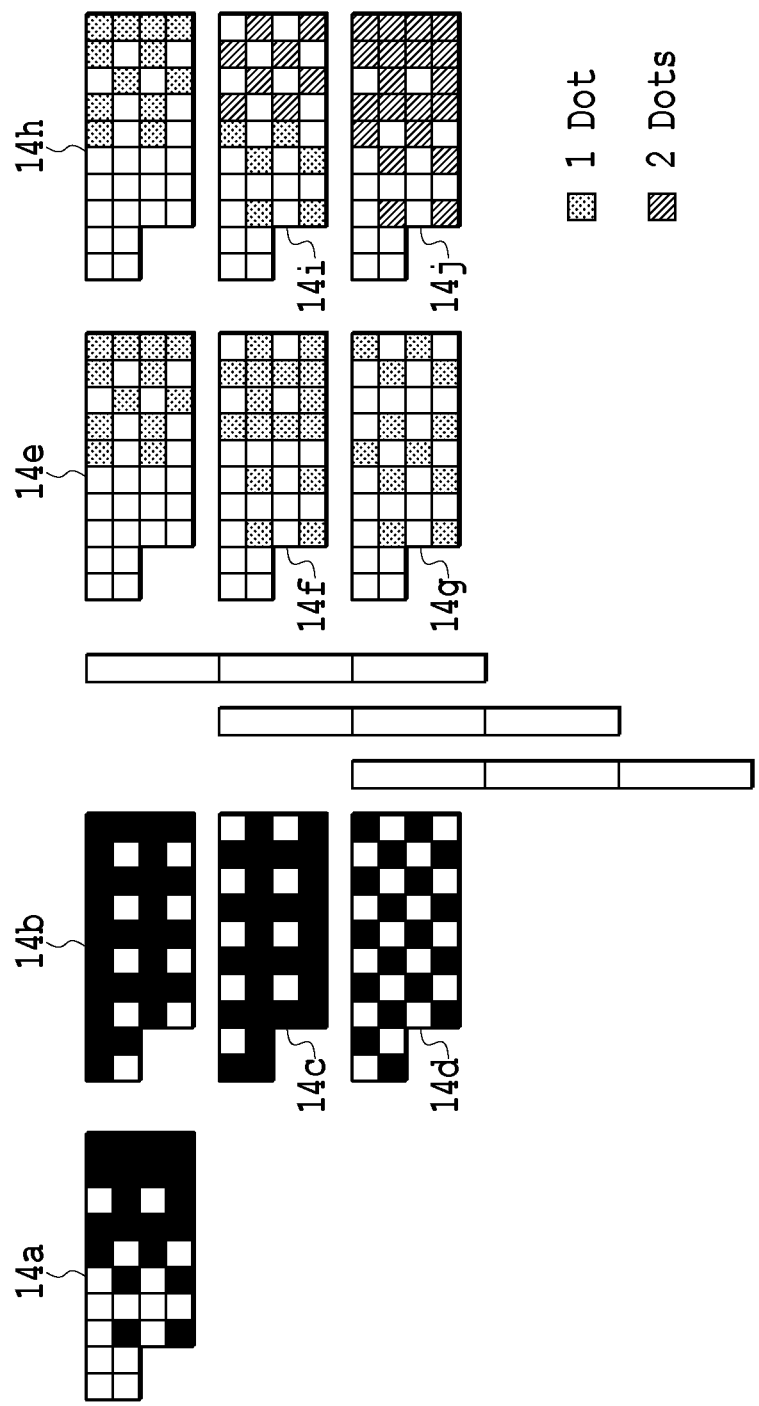
FIG. 14 is a diagram for concretely explaining the course of the processing at the 2nd high speed mode.

FIG. 14 is a diagram for concretely explaining the course of the processing relating to the input binary data, at the 2nd high speed mode. Here, 14a shows binary data input into the printing apparatus. The black areas indicate areas where a dot is printed and the white areas indicate areas where a dot is not printed.

Next, 14b to 14d are 3-pass mask patterns, P0010 to P0012, prepared by a mask data conversion process. In the figure the black areas indicate areas where a dot is permitted to be printed and the white areas indicate areas where a dot is not permitted to be printed. Here, 14b is the mask pattern P0010 used at the 1st pass (the 1st scan) with respect to the unit area, 14c is the mask pattern P0011 used at the 2nd pass, and 14d is the mask pattern P0012 used at the 3rd pass.

Then, 14e to 14g shows binary data that is the result obtained from performing a logical AND calculation between the binary data 14a and the respective mask patterns 14b to 14d. Here, 14e shows the result of a logical AND operation between the binary data 14a and the mask data 14b of the 1st pass, and is the binary data that is actually printed on the unit area of the print medium at the 1st pass. Here, the printed areas are shown in grey. The printed state of the unit area after the completion of the 1st pass is shown at 14h.

Next, 14f shows the result of a logical AND operation between the binary data 14a and the mask data 14c of the 2nd pass and is the binary data that is printed on the unit area of the print medium at the 2nd pass. Because the printing of the 2nd pass is performed after the printing of the first pass has already been performed, areas occur at the unit area where 2 overlapping dots are printed, as shown at 14i.

Furthermore, 14g shows the result of a logical AND operation between the binary data 14a and the mask data 14d of the 3rd pass and is the binary data that is printed on the unit area of the print medium at the 3rd pass. The printing of the 3rd pass is performed at the area where the printings of the first pass and the 2nd pass have already been performed. Thus, regarding the print sate of the unit area, as shown at 14j, 2 overlapping dots are printed at all of the areas.

Figure 15:
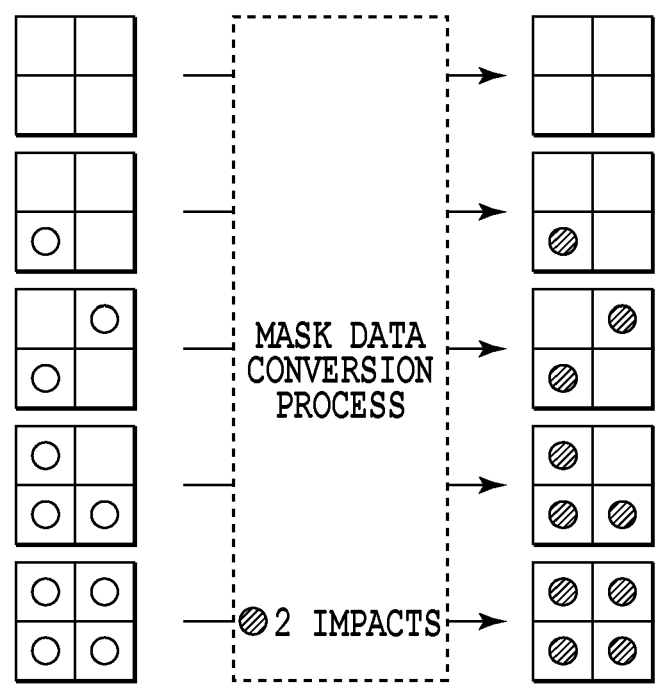
FIG. 15 is a diagram that illustrates the dot printing state at the 2nd high speed mode.

According to the 2nd high speed mode, as can be seen at FIG. 15, with respect to any of the print data two dots are uniformly printed at a print resolution of 1200 dpi by way of the mask data conversion process. In the case of such 2nd high speed mode it is possible, as shown at FIGS. 16A and 16B, to print an image that has gradation characteristics that are approximately analogous to that of the high image quality mode, even in the situation where it is not possible to cause the image resolution before the binarization and its level value to correspond.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-016782, filed Jan. 28, 2011, which is hereby incorporated by reference herein in its entirety.

What is claimed is:

1. An image processing apparatus for printing dots in a pixel region of a print medium by causing a print head for ejecting ink to scan the pixel region a plurality of times, the image processing apparatus comprising:

a mode setting unit configured to set a first printing mode for printing dots in the pixel region by N scans of the print head, where N is an integer of 2 or greater, and a second printing mode for printing dots in the pixel region by M scans of the print head, where M is an integer larger than N, at a print resolution higher than that of the first printing mode;

a conversion unit configured to convert gradation data having K number of gradation levels corresponding to the pixel region into binary data corresponding to the pixel region by using a plurality of dot arrangement patterns which determine print or non-print of a dot in each of a plurality of areas in the pixel region with respect to each gradation level, where K is an integer of 4 or greater; and a generation unit configured to generate a plurality of ejection data corresponding to the plurality of scans based on the binary data by using a plurality of mask patterns, each of which having a print permitting area permitting printing of a dot and a non-print permitting area not permitting printing of a dot in each of the plurality of areas;

wherein in a case that the first printing mode is set by the mode setting unit:

(A-i) the conversion unit converts the gradation data into first binary data by using a K number of first dot arrangement patterns, each of which determines print or non-print of a dot at each of J number of first areas in the pixel region, where J is an integer of 2 or greater and is smaller than K-1, wherein a number of first area determined print of a dot in the first dot arrangement pattern corresponding to a first gradation level is the same as a number of first area determined print of a dot in the first dot arrangement pattern corresponding to a second gradation level which is one level higher than the first gradation level, (A-ii) the generation unit generates N number of first ejection data based on the first binary data by using N number of first mask patterns, each of which having a first print permitting area permitting printing of a dot and a first non-print permitting area not permitting printing of a dot in each of the J number of first areas arranged such that (i) a sum of the first print permitting areas in the N number of first mask patterns becomes K-1, and (ii) a sum of the first print permitting areas, in the N number of first mask patterns, corresponding to position of the first area determined print of a dot by the first dot arrangement pattern corresponding to the second gradation level is more than a sum of the first print permitting areas, in the N number of first mask patterns, corresponding to position of the first area determined print of a dot by the first dot arrangement pattern corresponding to the first gradation level, and (A-iii) the K number of first dot arrangement patterns and N number of first mask patterns are determined so as to be able to represent K number of gradation levels by printing dots in the pixel area according to N number of first ejection data by the N scans of the print head, and wherein in a case that the second printing mode is set by the mode setting unit:

(B-i) the conversion unit converts the gradation data into second binary data by using K number of second dot arrangement patterns, each of which determines print or non-print of a dot at each of K-1 number of second areas in the pixel region, (B-ii) the generation unit generates M number of second ejection data based on the second binary data by using M number of second mask patterns, each of which having a second print permitting area permitting printing of a dot and a second non-print permitting area not permitting printing of a dot in each of the K-1 number of second areas arranged such that a sum of the second print permitting areas in the M number of second mask patterns becomes K-1, and (B-iii) the K number of second dot arrangement patterns and M number of second mask patterns are determined so as to be able to represent K number of gradation levels by printing dots in the pixel area according to M number of second ejection data by the M scans of the print head.

2. The image processing apparatus according to claim 1, wherein the generation unit generates M number of second ejection data by using M number of second mask patterns, with the second print permitting area in each of M number of the second mask patterns arranged such that each of K-1 number of second areas permits printing one time in M scans of the print head.

3. The image processing apparatus according to claim 1, wherein the generation unit generates M number of second ejection data by using M number of second mask patterns, with the second print permitting area in each of M number of the second mask patterns arranged so as to have an exclusive and complementary relationship with each other.

4. The image processing apparatus according to claim 1, wherein the generation unit generates N number of first ejection data by using N number of first mask patterns, with the first print permitting area in each of N number of the first mask patterns arranged such that J number of the first area include (i) a first area which permits printing one time in N scans of the print head, and (ii) a first area which is permits printing two times in N scans of the print head.

5. The image processing apparatus according to claim 4, wherein the first print permitting area in each of N number of the first mask patterns is arranged such that J number of the first area further includes (iii) a first area which permits printing three times in N scans of the print head.

6. The image processing apparatus according to claim 1, further comprising the print head.

7. The image processing apparatus according to claim 1, wherein the first print permitting area in each of N number of the first mask patterns is arranged such that a sum of the first print permitting areas, in the N number of first mask patterns, corresponding to position of the first area determined print of a dot by the first dot arrangement pattern corresponding to the second gradation level is one more than a sum of the first print permitting areas, in the N number of first mask patterns, corresponding to position of the first area determined print of a dot by the first dot arrangement pattern corresponding to the first gradation level.

8. The image processing apparatus according to claim 7, wherein a number of first area determined print of a dot in the first dot arrangement pattern corresponding to a first gradation level is the same as a number of first area determined print of a dot in the first dot arrangement pattern corresponding to a third gradation level which is one level higher than the second gradation level, and wherein the first print permitting area in each of N number of the first mask patterns is arranged such that a sum number of the first print permitting areas, in the N number of first mask patterns, corresponding to position of the first area determined print of a dot by the first dot arrangement pattern corresponding to the third gradation level is two more than a sum number of the first print permitting areas, in the N number of first mask patterns, corresponding to position of the first area determined print of a dot by the first dot arrangement pattern corresponding to the first gradation level.

9. A printing method for printing dots on a pixel region of a print medium by causing a print head for ejecting ink to scan the pixel region a plurality of times, comprising:

determining a first printing mode for printing dots in the pixel region by N scans of the print head, where N is an integer of 2 or greater, and a second printing mode for printing dots in the pixel region by M scans of the print head, where M is an integer larger than N, at a print resolution higher than that of the first printing mode;

converting gradation data having K number of gradation levels corresponding to the pixel region into binary data corresponding to the pixel region by using a plurality of dot arrangement patterns which determine print or non-print of a dot in each of a plurality of areas in the pixel region with respect to each gradation level, where K is an integer of 4 or greater; and generating a plurality of ejection data corresponding to the plurality of scans based on the binary data by using a plurality of mask patterns, each of which having a print permitting area permitting printing of a dot and a non-print permitting area not permitting printing of a dot in each of the plurality of areas;

wherein in a case that the first printing mode is determined:

(A-i) converting the gradation data into first binary data by using K number of first dot arrangement patterns, each of which determines print or non-print of a dot at each of J number of first areas which comprise in the pixel region, where J is an integer of 2 or greater, and is smaller than K-1, wherein a number of first area determined print of a dot in the first dot arrangement pattern corresponding to a first gradation level is the same as a number of first area determined print of a dot in the first dot arrangement pattern corresponding to a second gradation level, which is one level higher than the first gradation level, (A-ii) generating N number of first ejection data based on the first binary data by using N number of first mask patterns, each of which having a first print permitting area permitting printing of a dot and a first non-print permitting area not permitting printing of a dot in each of the J number of first areas arranged such that (i) a sum of the first print permitting areas in the N number of first mask patterns becomes K-1, and (ii) a sum of the first print permitting areas, in the N number of first mask patterns, corresponding to position of the first area determined print of a dot by the first dot arrangement pattern corresponding to the second gradation level is more than a sum of the first print permitting areas, in the N number of first mask patterns, corresponding to position of the first area determined print of a dot by the first dot arrangement pattern corresponding to the first gradation level, and (A-iii) the K number of first dot arrangement patterns and N number of first mask patterns are determined so as to be able to represent K number of gradation levels by printing dots on the pixel area according to N number of first ejection data by the N scans of the print head, and wherein in a case that the second printing mode is determined:

(B-i) converting the gradation data into second binary data by using K number of second dot arrangement patterns, each of which determines print or non-print of a dot at each of K-1 number of second areas in the pixel region, (B-ii) generating M number of second ejection data based on the second binary data by using M number of second mask patterns, each of which having a second print permitting area permitting printing of a dot and a second non-print permitting area not permitting printing of a dot in each of the K-1 number of second areas arranged such that a sum of the second print permitting area in the M number of second mask patterns becomes K-1, and (B-iii) the K number of second dot arrangement patterns and M number of second mask patterns are determined so as to be able to represent K number of gradation levels by printing dots in the pixel area according to M number of second ejection data by the M scans of the print head.

10. A printing system comprising:

a printing apparatus for printing dots on a pixel region of a print medium comprising a print head for ejecting ink, and a scanning unit configured to cause the print head to scan the pixel region a plurality of times;

a data supplying apparatus for supplying data used for printing to the printing apparatus;

a mode setting unit configured to set a first printing mode for printing dots in the pixel region by N scans of the print head, where N is an integer of 2 or greater, and a second printing mode for printing dots in the pixel region by M scans of the print head, where M is an integer larger than N, at a print resolution higher than that of the first printing mode;

a conversion unit configured to convert a gradation data having K number of gradation levels corresponding to the pixel region into binary data corresponding to the pixel region by using a plurality of dot arrangement patterns which determine print or non-print of a dot in each of a plurality of areas in the pixel region with respect to each gradation level, where K is an integer of 4 or greater; and a generation unit configured to generate a plurality of ejection data corresponding to the plurality of scans based on the binary data by using a plurality of mask patterns, each of which having a print permitting area permitting printing of a dot and a non-print permitting area not permitting printing of a dot in each of the plurality of areas;

wherein in a case that the first printing mode is set by the mode setting unit:

(A-i) the conversion unit converts the gradation data into first binary data by using a K number of first dot arrangement patterns, each of which determines print or non-print of a dot at each of J number of first areas in the pixel region, where J is an integer of 2 or greater and is smaller than K-1, wherein a number of first area determined print of a dot in the first dot arrangement pattern corresponding to a first gradation level is the same as a number of first area determined print of a dot in the first dot arrangement pattern corresponding to a second gradation level which is one level higher than the first gradation level, (A-ii) the generation unit generates N number of first ejection data based on the first binary data by using N number of first mask patterns, each of which having a first print permitting area permitting printing of a dot and a first non-print permitting area not permitting printing of a dot in each of the J number of first areas arranged such that (i) a sum of the first print permitting areas in the N number of first mask patterns becomes K-1, and (ii) a sum of the first print permitting areas, in the N number of first mask patterns, corresponding to position of the first area determined print of a dot by the first dot arrangement pattern corresponding to the second gradation level is more than a sum of the first print permitting areas, in the N number of first mask patterns, corresponding to position of the first area determined print of a dot by the first dot arrangement pattern corresponding to the first gradation level, and (A-iii) the K number of first dot arrangement patterns and N number of first mask patterns are determined so as to be able to represent K number of gradation levels by printing dots on the pixel area according to N number of first ejection data by the N scans of the print head, and wherein in a case that the second printing mode is set by the mode setting unit:

(B-i) the conversion unit converts the gradation data into the second binary data by using K number of second dot arrangement patterns, each of which determines print or non-print of a dot at each of a K-1 number of second areas in the pixel region, (B-ii) the generation unit generates M number of second ejection data based on the second binary data by using M number of second mask patterns, each of which having a second print permitting area permitting printing of a dot and a second non-print permitting area not permitting printing of a dot in each of the K-1 number of second areas arranged such that a sum of second print permitting areas in the M number of second mask patterns becomes K-1, and (B-iii) the K number of second dot arrangement patterns and M number of second mask patterns are determined so as to be able to represent K number of gradation levels by printing dots on the pixel area according to M number of second ejection data by the M scans of the print head.

11. An image processing apparatus for printing dots in a pixel region of a print medium by causing a print head for ejecting ink to scan the pixel region a plurality of times, the image processing apparatus comprising:

a conversion unit configured to convert gradation data having K number of gradation levels corresponding to the pixel region into binary data corresponding to the pixel region by using a plurality of dot arrangement patterns which determine print or non-print of a dot in each of a plurality of areas in the pixel region with respect to each gradation level, where K is an integer of 4 or greater; and a generation unit configured to generate a plurality of ejection data corresponding to the plurality of scans based on the binary data by using a plurality of mask patterns, each of which having a print permitting area permitting printing of a dot and a non-print permitting area not permitting printing of a dot in each of the plurality of areas; wherein (A-i) the conversion unit converts the gradation data into first binary data by using a K number of first dot arrangement patterns, each of which determines print or non-print of a dot at each of J number of first areas in the pixel region, where J is an integer of 2 or greater and is smaller than K-1, wherein a number of first area determined print of a dot in the first dot arrangement pattern corresponding to a first gradation level is the same as a number of first area determined print of a dot in the first dot arrangement pattern corresponding to a second gradation level which is one level higher than the first gradation level, (A-ii) the generation unit generates a plurality of first ejection data based on the first binary data by using a plurality of first mask patterns, each of which having a first print permitting area permitting printing of a dot and a first non-print permitting area not permitting printing of a dot in each of the J number of first areas arranged such that (i) a sum of the first print permitting areas in the plurality of first mask patterns becomes K-1, and (ii) a sum of the first print permitting areas, in the plurality of first mask patterns, corresponding to position of the first area determined print of a dot by the first dot arrangement pattern corresponding to the second gradation level is one more than a sum of the first print permitting areas, in the plurality of first mask patterns, corresponding to position of the first area determined print of a dot by the first dot arrangement pattern corresponding to the first gradation level.

12. The image processing apparatus according to claim 11, wherein (A-iii) the K number of first dot arrangement patterns and the plurality of first mask patterns are determined so as to be able to represent K number of gradation levels by printing dots in the pixel area according to the plurality of first ejection data by the plurality of scans of the print head.

\* \* \* \* \*